United States Patent [19]
Asakura

[11] Patent Number: 5,243,552
[45] Date of Patent: Sep. 7, 1993

[54] COEFFICIENT MULTIPLYING CIRCUIT

[75] Inventor: Nobuyuki Asakura, Kanagawa, Japan

[73] Assignee: Sony Corporation, Tokyo, Japan

[21] Appl. No.: 715,658

[22] Filed: Jun. 14, 1991

[30] Foreign Application Priority Data

Jun. 19, 1990 [JP] Japan .................................. 2-160230

[51] Int. Cl.$^5$ ........................ G06F 7/52; G06F 15/31
[52] U.S. Cl. ................................ 364/757; 364/724.16
[58] Field of Search ........................... 364/757, 724.16

[56] References Cited

U.S. PATENT DOCUMENTS 4,771,395  9/1988  Watanabe et al. ............. 364/724.16
5,117,385  5/1992  Gee ..................................... 364/757

Primary Examiner—Long T. Nguyen
Attorney, Agent, or Firm—Lewis H. Eslinger; Jay H. Maioli

[57] ABSTRACT

A coefficient multiplying circuit comprises (m+1) bit shifters which are supplied with an input binary signal and respectively have a number of bit shifts different from one another in association with a binary coefficient, m synthesizers for sequentially adding or subtracting outputs from the (m+1) shift bits in accordance with the binary coefficient, and a circuit for outputting an output binary signal derived from multiplying the binary coefficient and the input binary signal from the synthesizer at the last stage of the m synthesizers.

1 Claim, 6 Drawing Sheets

FIG. 3

| | Number of Adders | 0 | 1 | 2 | 3 | 4 | 5 | 6 | 7 | 8 | 9 | 10 |
|---|---|---|---|---|---|---|---|---|---|---|---|---|
| | Number of Coefficients of This Invention | 11 | 81 | 280 | 420 | 216 | 16 | | | | | |
| Number of Adders | Number of Coefficients of Prior-Art Example | | | | | | | | | | | |
| 0 | 11 | 11 | 0 | 0 | 0 | 0 | 0 | 0 | 0 | 0 | 0 | 0 |
| 1 | 45 | 0 | 45 | 0 | 0 | 0 | 0 | 0 | 0 | 0 | 0 | 0 |
| 2 | 120 | 0 | 8 | 112 | 0 | 0 | 0 | 0 | 0 | 0 | 0 | 0 |
| 3 | 210 | 0 | 7 | 48 | 155 | 0 | 0 | 0 | 0 | 0 | 0 | 0 |
| 4 | 252 | 0 | 6 | 40 | 104 | 102 | 0 | 0 | 0 | 0 | 0 | 0 |
| 5 | 210 | 0 | 5 | 32 | 81 | 76 | 16 | 0 | 0 | 0 | 0 | 0 |
| 6 | 120 | 0 | 4 | 24 | 54 | 38 | 0 | 0 | 0 | 0 | 0 | 0 |
| 7 | 45 | 0 | 3 | 16 | 26 | 0 | 0 | 0 | 0 | 0 | 0 | 0 |
| 8 | 10 | 0 | 2 | 8 | 0 | 0 | 0 | 0 | 0 | 0 | 0 | 0 |
| 9 | 1 | 0 | 1 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | ced
COEFFICIENT MULTIPLYING CIRCUIT

BACKGROUND OF THE INVENTION

1. Field of the Invention

The present invention generally relates to coefficient multiplying circuits and, more particularly, is directed to a coefficient multiplying circuit in which the number of synthesizers can be reduced.

2. Description of the Prior Art

A conventional coefficient multiplying circuit of a shift-add type will hereinafter be described with reference to FIG. 1.

In FIG. 1, reference letter Tin designates an input terminal which is supplied with an input parallel binary signal. Reference letters $BS_0$, $BS_1$, $BS_2$, ..., $BSm$ designate $(m+1)$ bit shifters which are commonly supplied with the input parallel binary signal from the input terminal Tin, wherein numbers $N_0$, $N_1$, $N_2$, ..., $Nm$ of bit shifts performed by the respective bit shifters $BS_0$, $BS_1$, $BS_2$, ..., $BSm$ are made different from one another. The number of these bit shifters and the numbers $N_0$, $N_1$, $N_2$, ..., $Nm$ of bit shifts are determined by binary coefficients which are multiplied with the input parallel binary signal. In this example, $N_0 < N_1 < N_2 < ... < Nm$ is satisfied.

Outputs from the bit shifters $BS_0$, $BS_1$ are supplied to an adder $AD_1$ to be added to each other, an output from the adder $AD_1$ and an output from the bit shifter $BS_2$ are supplied to an adder $AD_2$ to be added to each other, ..., and an adder $ADm$ at the last stage outputs a binary signal derived by multiplying a binary coefficient with the input binary signal and supplies the same to an output terminal Tout.

Next, the relation between a decimal coefficient and a binary coefficient will be described. A coefficient A expressed by a decimal number is given by the sum of powers of two, where the power numbers are different from one another, as shown in the following equation:

$$A = 2^{N_0} + 2^{N_1} + 2^{N_2} + ... + 2^{Nm} \quad (1)$$

where $N_0 \neq N_1 N_2 \neq ... \neq Nm$ and $$N_0 < N_1 < N_2 < ... < Nm$$

At this time, Nm is a value which satisfies the following condition:

$$2^{Nm} \leq A < 2^{Nm+1} \quad (2)$$

To derive powers of two constituting the coefficients A, B expressed by decimal numbers, supposing $A_0 = A$, $B_0 = B$, N satisfying the following equations is calculated as shown in FIGS. 2A and 2B:

$$2^{Nm} \leq A_0 < 2^{Nm+1}$$

$$2^{Nm} \leq B_0 < 2^{Nm+1}$$

Then, irrespective of whether $A_0$, $B_0$ are close to $2^{Nm}$ or $2^{Nm+1}$, $A_0 - 2^{Nm} = A_1$, $B_0 - 2^{Nm} = B_1$ are substituted for $A_0$, $B_0$, and the same operation is repeated.

Considering 1, 2, ..., 1024 as coefficients expressed by decimal numbers, the number of coefficients which respectively make the number of adders as 0, 1, 2, ..., 9 are as shown in the left side of the table shown in FIG. 3 from which it is understood that there are many coefficients which require a large number of adders.

OBJECTS AND SUMMARY OF THE INVENTION

Accordingly, it is an object of the present invention to provide an improved coefficient multiplying circuit in which the aforenoted shortcomings and disadvantages encountered with the prior art can be substantially eliminated.

More specifically, it is an object of the present invention to provide a coefficient multiplying circuit in which the number of synthesizers can be reduced.

According to an aspect of the present invention, a coefficient multiplying circuit comprises $(m+1)$ bit shifters which are supplied with an input binary signal and respectively have a number of bit shifts different from one another in association with a binary coefficient, m synthesizers for sequentially adding or subtracting outputs from the $(m+1)$ shift bits in accordance with the binary coefficient, and a circuit for outputting an output binary signal produced by multiplying the binary coefficient with the input binary signal from the synthesizer at the last stage of the m synthesizers.

The above, and other objects, features and advantages of the present invention will become apparent in the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 3 is a table to which references will be made in explaining a relation between the number of adders and the number of coefficients in the case of the prior art and the present invention;

DETAILED DESCRIPTION OF THE PREFERRED EMBODIMENT

An embodiment of the coefficient multiplying circuit according to the present invention will hereinafter be described in detail with reference to FIG. 4.

Figure 1:
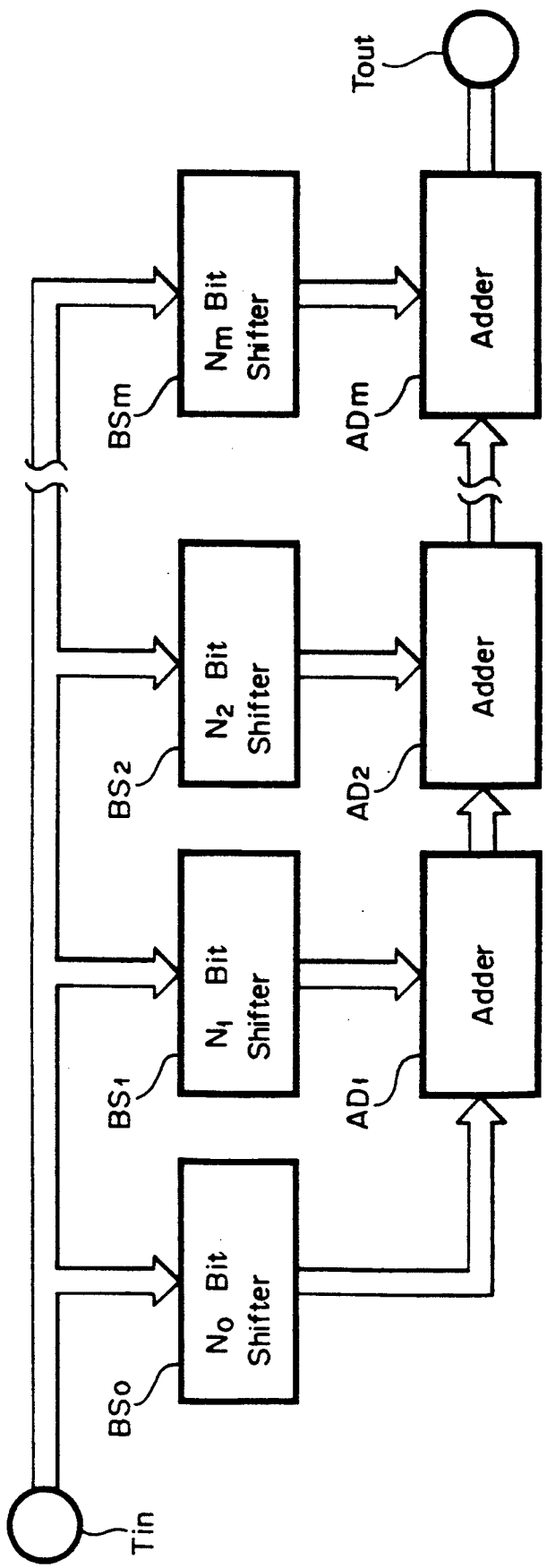
FIG. 1 is a schematic block diagram used to explain a shift-add type coefficient multiplying circuit according to the prior art.
Figure 2A:
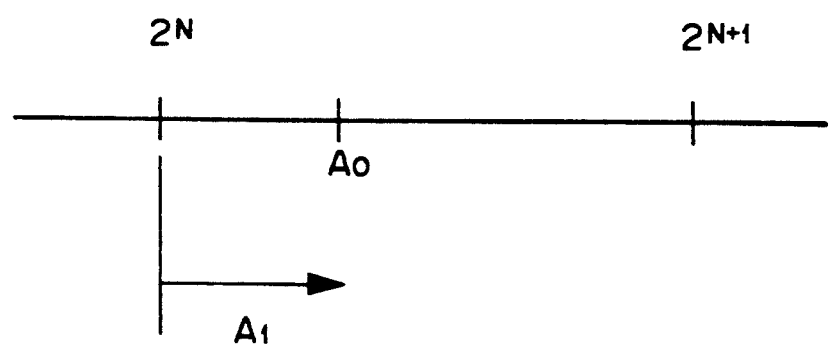
FIGS. 2A and 2B are schematic diagrams used, respectively, to explain operation of the conventional coefficient multiplying circuit of FIG. 1.
Figure 2B:
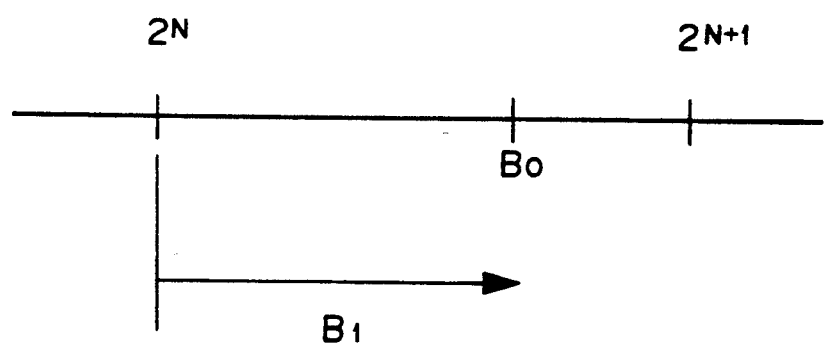
Figure 4:
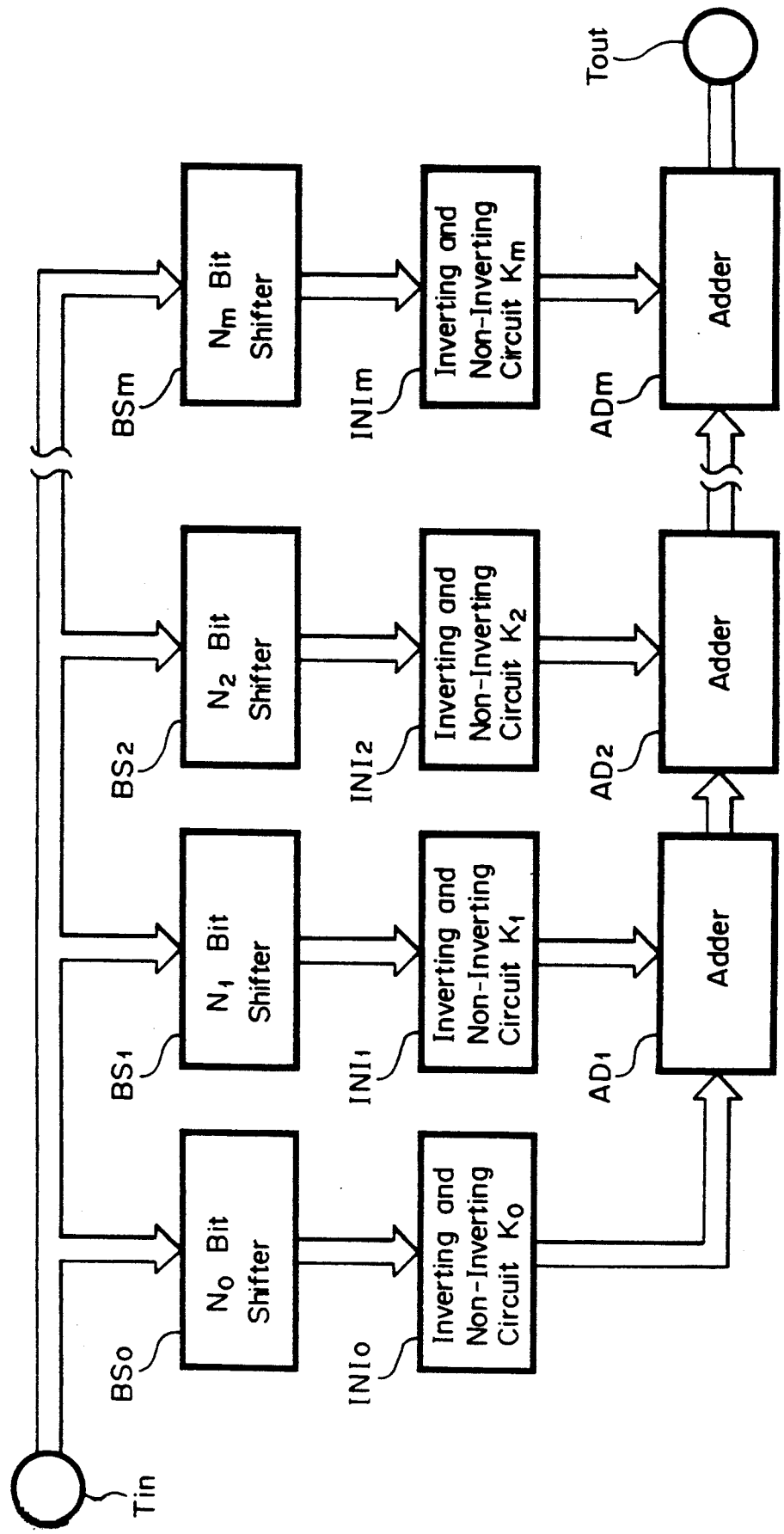
FIG. 4 is a schematic block diagram showing an embodiment of a coefficient multiplying circuit according to the present invention.

In FIG. 4, reference letter Tin designates an input terminal to which an input parallel binary signal is supplied. Reference letters $BS_0$, $BS_1$, $BS_2$, ..., $BSm$ designate $(m+1)$ bit shifters to which the input parallel binary signal from the input terminal Tin is commonly supplied, wherein numbers $N_0$, $N_1$, $N_2$, ..., $Nm$ of bit shifts performed by the respective bit shifters $BS_0$, $BS_1$, $BS_2$, ..., $BSm$ are different from one another. The number of these bit shifters and the numbers $N_0$, $N_1$, $N_2$, ..., $Nm$ of bit shifts are determined by a binary coefficient which is multiplied with the input parallel binary signal. In this embodiment, $N_0 < N_1 < N_2 < \ldots < Nm$ is satisfied.

Outputs from the respective bit shifters $BS_0$, $BS_1$, $BS_2, \ldots, BSm$ are supplied to inverting and non-inverting circuits $INI_0$, $INI_1$, $INI_2, \ldots, INIm$, respectively. Then, outputs from the inverting and non-inverting circuits $INI_0$, $INI_1$ are supplied to an adder $AD_1$ to be added to each other, an output from the adder $AD_1$ and an output from the inverting and non-inverting circuit $INI_2$ are supplied to an adder $AD_2$ to be added to each other, ..., and an adder $ADm$ at the last stage outputs a binary signal derived by multiplying a binary coefficient with the input binary signal and supplies the same to an output terminal Tout.

Next, the relation between a decimal coefficient and a binary coefficient will be described. A coefficient A expressed by a decimal number is given by the sum of powers of two multiplied with a constant $+1$ or $-1$, where the power numbers are different from one another, as shown in the following equation:

$$A = K_0 2^{N_0} + K_1 2^{N_1} + K_2 2^{N_2} + \ldots + Km 2^{Nm} \quad (3)$$

where $N_0 \neq N_1 \neq N_2 \neq \ldots \neq Nm$; $N_0 < N_1 < N_2 < \ldots < Nm$;
and $K_0, K_1, K_2, \ldots, Km$: Constant $+1$ or $-1$ At this time, Nm is a value which satisfies the following condition:

$$2^{Nm} - 2^{Nm-1} < A < 2^{Nm} + 2^{Nm-1} \quad (4)$$

Figure 5A:
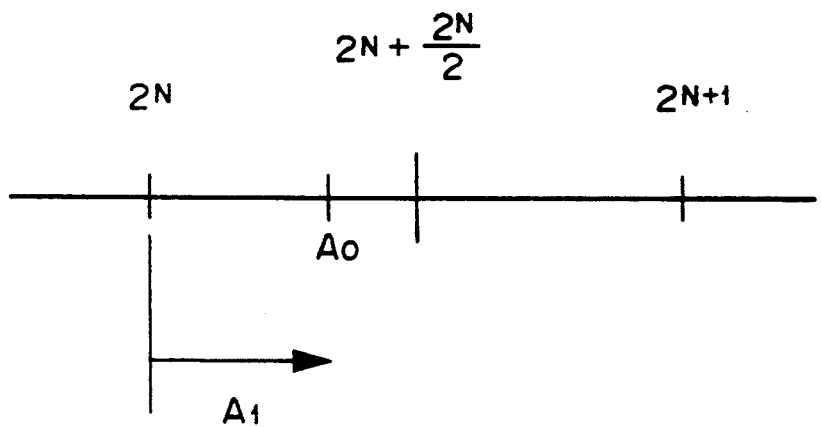
FIGS. 5A and 5B are schematic diagrams used, respectively, to explain operation of the coefficient multiplying circuit according to present invention.
Figure 5B:
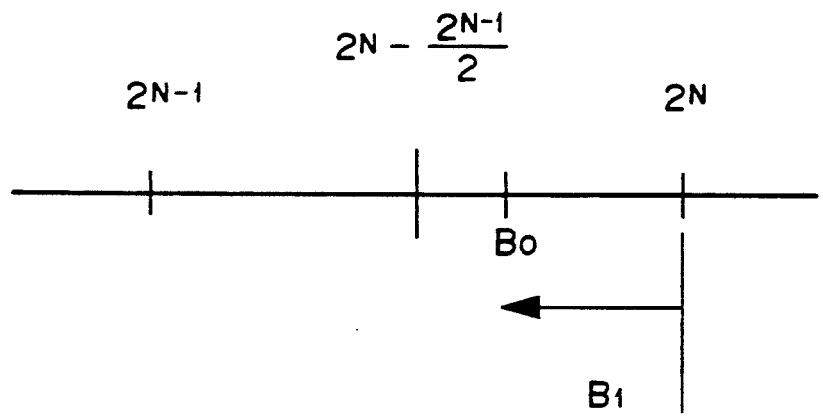

To derive powers of two constituting the coefficient A expressed by a decimal number, as shown in FIG. 5A, $A_0 = A$ is given. When $A_0$ exists between $2^N$ and $2^{n+1}$, it is determined on which side of the median point $2^N + 2^N/2$ $A_0$ exists. When $A_0$ exists between $2^N$ and $2^N + 2^N/2$, as shown in FIG. 5A, $A_0 - 2^N = A_1$ is defined. Also, since $A_1$ is positive, $K_0 = +1$ is given, and subsequently the above-mentioned operation is repeated. Similarly, to derive powers of two constituting the coefficient B expressed by a decimal number, $B_0 = B$ is given, as shown in FIG. 5B. When $B_0$ exists between $2^{N-1}$ and $2^N$, it is determined on which side of the median point $2^N - 2^{N-1}/2$ $B_0$ exists, as shown in FIG. 5B. When $B_0$ exists between $2^N - 2^{N-1}/2$ and $2^N$, as shown in FIG. 5B, $B_0 - 2^N = B_1$ is defined. Also, since $B_1$ is negative, $K_0 = -1$ is given, and subsequently the above-mentioned operation is repeated.

Considering 1, 2, ..., 1024 as coefficients expressed by decimal numbers, the number of coefficients which respectively made the numbers of adders as 1, 2, ..., 9 are as shown in the upper side of the table shown in FIG. 3 from which it is understood that there are a reduced number of coefficients which require a large number of adders, compared with the example of the prior art.

Incidentally, portions except for the left side and the upper side of the table shown in FIG. 3 respectively indicate the numbers of coefficients which belong to the left side and the upper side.

From the table of FIG. 3, the following is understood: An average number of adders in conventional coefficient multiplying circuit is five, whereas, that of the present invention is reduced to 3.78. Comparing a prior art example with the present invention for a case of expressing an identical binary coefficient, the number of coefficients which require the same number of adders is 441 while the number of coefficients which require a reduced number of adders is 583.

Next, a processing of obtaining a binary coefficient from a decimal coefficient, executed by the embodiment shown in FIG. 4, will be explained with reference to a flowchart of FIG. 6.

Figure 6:
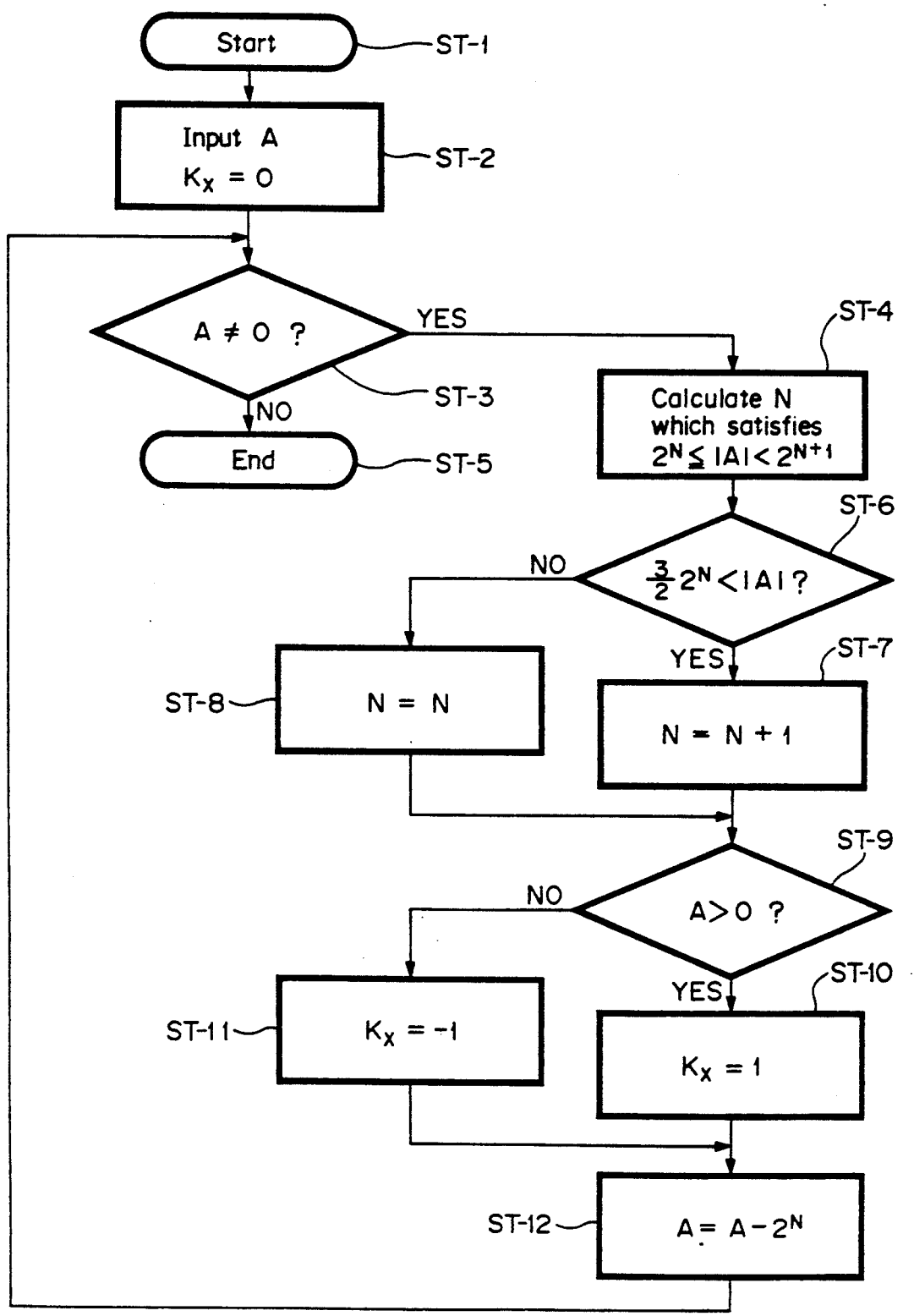
FIG. 6 is a flowchart to which references will be made in explaining operation for obtaining a binary coefficient from a decimal coefficient according to the present invention.

Referring to FIG. 6, the processing of obtaining a binary coefficient from a decimal coefficient begins with step ST-1 and the processing proceeds to step ST-2. At step ST-2, a decimal coefficient A is inputted, and a coefficient Kx is set to zero. It is determined at the next decision step ST-3 whether or not $A \neq 0$ is established. If a NO is output at decision step ST-3, or if $A = 0$ is established, the processing is ended with step ST-5. If a YES is output at decision step ST-3, the processing proceeds to step ST-4. In step ST-4, N which satisfies $2^N \leq |A| < 2^{N+1}$ is derived, and then the processing proceeds to the next decision step ST-6, whereat it is determined whether $(3/2)2^N < |A|$ is established or not. If a NO is output at decision step ST-6, the procedure proceeds to step ST-8, where N is maintained as it is. If on the other hand a YES is output at decisions step ST-6, the processing proceeds to step ST-7, where N is replaced with N+1. After steps ST-7 and ST-8 are executed, the processing proceeds to the next decision step ST-9, whereat it is determined whether or not an inequality of $A > 0$ is established. If a NO is output at decision step ST-9, the processing proceeds to step ST-11 where the constant Kx is set to $-1$. If a YES is output, the processing proceeds to step ST-10, where Kx is set to 1. After steps ST-10 and ST-11 are executed, the processing proceeds to step ST-12, whereat A is replaced with $A - 2^N$. Then, the processing returns to decision step ST-3 and the above-mentioned processing is repeated till the step ST-5.

According to the above-mentioned coefficient multiplying circuit of the present invention, the coefficient multiplying circuit comprises the (m+1) bit shifters which are supplied with an input binary signal and respectively have a number of bit shifts different from one another in association with a binary coefficient, and m synthesizers for sequentially adding or subtracting outputs from the (m+1) shift bits in accordance with the binary coefficient, wherein an output binary signal produced by multiplying the binary coefficient with the input binary signal is outputted from the synthesizer at the last stage of the m synthesizers, whereby the number of synthesizers corresponding to the binary coefficient is reduced with a high possibility.

Incidentally, if a synthesizer is composed of an adder and an inverting and non-inverting circuit, the adder is far larger than the inverting and non-inverting circuit in gate scale, so that an effect achieved by reducing the number of adders is remarkable even if the inverting and non-inverting circuit is added.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

I claim as my invention:

1. A coefficient multiplying circuit comprising:
   (m+1) bit shifters supplied with an input parallel binary signal for performing a respective number of bit shifts different from one another in association with a binary coefficient;

m synthesizers arranged sequentially from a first synthesizer to an m-th synthesizer for sequentially adding or subtracting outputs from said (m+1) bit shifters in accordance with a relationship between said binary coefficient and a median value between successive powers of two, wherein said synthesizers are formed of (m+1) inverting and non-inverting circuits respectively receiving bit-shifted outputs from said (m+1) bit shifters and selectively applying thereto a positive or negative unit constant and m adders respectively receiving inverted or non-inverted outputs from said inverting and non-inverting circuits; and means for outputting a product binary signal from the m-th synthesizer produced by sequentially adding in the respective m adders of said synthesizers the product of said binary coefficient and said input binary signal.

* * * * *